(12) United States Patent
Foster et al.

(10) Patent No.: US 7,395,082 B2
(45) Date of Patent: Jul. 1, 2008

(54) METHOD AND SYSTEM FOR HANDLING EVENTS IN AN APPLICATION FRAMEWORK FOR A WIRELESS DEVICE

(75) Inventors: Derek John Foster, Cupertino, CA (US); Lori Yoshida, San Jose, CA (US); Richard Zhang, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 242 days.

(21) Appl. No.: 10/925,811

(22) Filed: Aug. 25, 2004

(65) Prior Publication Data

US 2005/0286457 A1    Dec. 29, 2005

Related U.S. Application Data

(60) Provisional application No. 60/582,144, filed on Jun. 23, 2004.

(51) Int. Cl.
*H04M 1/00* (2006.01)
(52) U.S. Cl. .................... 455/550.1; 455/425; 709/201; 710/5; 712/1; 712/17; 712/28; 712/200; 712/208; 712/214; 719/318; 719/328
(58) Field of Classification Search .............. 455/414.1, 455/550.1, 575.1, 575.2, 575.3, 575.4, 575.5, 455/575.6, 412.1, 412.2, 425, 556.2; 719/318, 719/328; 709/224, 201, 202; 710/5, 6, 74; 712/1, 17, 21, 28, 200, 202, 205, 208, 214, 712/220
See application file for complete search history.

(56) References Cited

U.S. PATENT DOCUMENTS

| | | | |
|---|---|---|---|
| 4,901,223 A * | 2/1990 | Rhyne | 345/475 |
| 2003/0079048 A1* | 4/2003 | Kim | 709/318 |
| 2005/0118996 A1* | 6/2005 | Lee et al. | 455/425 |
| 2005/0124379 A1* | 6/2005 | Liu | 455/556.1 |
| 2006/0202953 A1* | 9/2006 | Pryor et al. | 345/156 |

* cited by examiner

*Primary Examiner*—William G. Trost
*Assistant Examiner*—James D Ewart
(74) *Attorney, Agent, or Firm*—McAndrews, Held & Malloy, Ltd.

(57) ABSTRACT

Methods and systems for application framework development for wireless devices are provided herein. Aspects of the method may include acquiring an MMI event from an MMI event queue within the MMI wireless framework. An identity of the acquired MMI event may be determined and the acquired MMI event may be dispatched to an event handler based on the determined identity of the acquired event. If the acquired MMI event comprises a timing event, the acquired MMI event may be dispatched to an MMI event owner within the MMI wireless framework. If the acquired MMI event comprises a keypad event, the acquired MMI event may be dispatched to a currently active MMI view within the MMI wireless framework. If the acquired MMI event comprises an addressed event, the acquired MMI event may be dispatched to a destination handler within the MMI wireless framework.

30 Claims, 4 Drawing Sheets

METHOD AND SYSTEM FOR HANDLING EVENTS IN AN APPLICATION FRAMEWORK FOR A WIRELESS DEVICE

CROSS-REFERENCE TO RELATED APPLICATIONS/INCORPORATION BY REFERENCE

This application makes reference to, claims priority to, and claims the benefit of U.S. Provisional Application Ser. No. 60/582,144 filed Jun. 23, 2004.

This application also makes reference to: U.S. application Ser. No. 10/926,256, filed on Aug. 25, 2004; and U.S. application Ser. No. 10/926,255 filed on Aug. 25, 2004.

The above stated applications are hereby incorporated herein by reference in their entirety.

FIELD OF THE INVENTION

Certain embodiments of the invention relates to the development of applications for wireless devices. More specifically, certain embodiments of the invention relate to a method and system for application framework development for wireless devices.

BACKGROUND OF THE INVENTION

A man-machine interface (MMI) may provide one or more user interfaces that may be utilized to facilitate user interaction with various telecommunication functions provided by a communication device. Exemplary telecommunication devices may comprise, a wireless personal digital assistant (PDA), a wireless telephone or a hybrid wireless PDA and telephone. The functionality that is provided by a conventional MMI may include one or more interfaces that may be utilized to dial telephone directory numbers, answer telephone calls, create, send and/or receive messages, and establish and/or change configuration or user settings. Different types of communication devices may require different types of man-machine interfaces to exploit the features that may be provided by the different devices. Accordingly, a user of a communication device may utilize the man machine interface to access various unique features and services provided by a service provider and which are accessible via a particular communication device communicatively coupled to the service provider's network. Today, there are various wireless communication standards, some of which may comprise Nordic Mobile Telephony (NMT), Advanced Mobile Phone Service (AMPS), Total Access Communication System (TACS), Global System for Mobile communications (GSM), Digital AMPS (D-AMPS), Personal Digital Cellular system (PDC), Extended TACS (ETACS), Digital European Cordless Telephone system (DECT), Cordless Telephone 2 (CT 2), and Cordless Telephone 3 (CT 3). In order to access various features that may be unique to each of these standards, a different man machine interface is required.

Application development frameworks may be utilized for design and development of man-machine interfaces for various different types of wireless devices. During development of each of these man-machine interfaces utilizing conventional application development frameworks, the functionality of these man-machine interfaces are outlined with different degrees of specificity in order to exploit the various features. This hinders the production and development process because, while wireless devices may vary to some degree between different manufacturers, they all possess approximately the same functionality and key configurations, which are defined by each relevant, specified standard.

In addition, man-machine interfaces utilizing conventional application development frameworks are programmed in such a way that they do not currently possess the necessary flexibility required by today's technology markets. In other words, there is an insufficient level of flexibility with the degree of customization and modification with regard to existing standard implementations. In this regard, existing application development frameworks do not provide sufficient flexibility and uniformity during the production and development of man machine interface applications for different wireless communication device designs. Furthermore, current application development frameworks create applications that utilize a significant portion of the limited memory on a wireless device, which may result in memory overload.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for managing a plurality of events within a man machine interface (MMI) application framework. Aspects of the method may include acquiring an MMI event from an MMI event queue within the MMI wireless framework. An identity of the acquired MMI event may be determined and the acquired MMI event may be dispatched to an event handler based on the determined identity of the acquired event. If the acquired MMI event comprises a timing event, the acquired MMI event may be dispatched to an MMI event owner within the MMI wireless framework. If the acquired MMI event comprises a keypad event, the acquired MMI event may be dispatched to a currently active MMI view within the MMI wireless framework. If the acquired MMI event comprises an addressed event, the acquired MMI event may be dispatched to a destination handler within the MMI wireless framework.

If the acquired MMI event comprises a platform event, the acquired MMI event may be dispatched to a registered handler within the MMI wireless framework. If the acquired MMI event comprises an unaddressed application specific event, the acquired MMI event may be dispatched to an application manager within the MMI wireless framework. If the acquired MMI event comprises an unaddressed non-application specific event, the acquired MMI event may be dispatched to a current target handler within the wireless framework. An event timer may be terminated upon receipt of the timing event by the MMI event owner.

A depressed key may be identified by the currently active MMI view upon receipt of the keypad event. The addressed event may be dispatched to at least one application comprising a phonebook application, a call control application, or a messaging application. The platform event may comprise a platform API interrupt message. The unaddressed application specific event may be delegated to a handling application by the application manager. The unaddressed non-application specific event may be matched with a message within a message chain of the current target handler.

Another aspect of the invention may provide a machine-readable storage, having stored thereon, a computer program having at least one code section executable by a machine, thereby causing the machine to perform the steps as described above for managing a plurality of events within a man machine interface (MMI) application framework.

Aspects of the system for managing a plurality of events within a man machine interface (MMI) application framework may comprise an MMI event queue from which an MMI event is acquired within the MMI wireless framework and an event handler to which the acquired MMI event is dispatched based on a determined identity of the acquired MMI event. The system may comprise the following: an MMI event owner within the MMI wireless framework to which the MMI event is dispatched if the acquired MMI event comprises a timing event; a currently active MMI view within the MMI wireless framework to which the MMI event is dispatched if the MMI event comprises a keypad event; a destination handler within the MMI wireless framework to which the MMI event is dispatched if the MMI event comprises an addressed event; at least one registered handler within the MMI wireless framework to which the MMI event is dispatched if the MMI event comprises a platform event; an application manager within the MMI wireless framework to which the MMI event is dispatched if the MMI event comprises an unaddressed application specific event; and a current target handler within the MMI wireless framework to which the MMI event is dispatched if the MMI event comprises an unaddressed non-application specific application specific event.

The system may further comprise an event timer that is terminated upon receipt of the timing event by the MMI event owner. The currently active MMI view may be adapted to identify a depressed key upon receipt of the keypad event. The addressed event may be dispatched to at least one application, the latter of which may include, for example, a phonebook application, a call control application, and/or a messaging application. The platform event comprises a platform API interrupt message and the application manager delegates the unaddressed application specific event to a handling application. The unaddressed non-application specific event may be matched with a message within a message chain of the current target handler and the handler may be registered to acquire the MMI event, if the acquired MMI event comprises a platform event. In accordance with an aspect of the invention, the acquired MMI event may be derived from a message handling class within the MMI application framework.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for managing a plurality of events within a man machine interface (MMI) application framework. An MMI framework in accordance with an embodiment of the invention, may be event driven, and may employ a layered architecture with object oriented design (OOD). The MMI framework may be implemented in a software programming language, such as C++, and may comprise application base classes, managers, a view system, drawing primitives and system services. The layered architecture may be designed to permit efficient independent development of device specific applications that utilize a minimum amount of on-chip memory.

The MMI framework may be adapted to utilize a plurality of managers, each of which may be configured to handle one or more different areas of responsibilities within the framework. For example, in accordance with an aspect of the invention, an event manager may be adapted to acquire an MMI event from an MMI event queue within an MMI wireless framework. In addition, the MMI event manager may be adapted to dispatch a plurality of MMI events to one or more applications for processing. MMI events may be processed by an application based on their type and features or characteristics. The MMI events that may be handled by the MMI event manager may comprise a timing event, a keypad event, an addressed event, a platform event, an un-addressed application-specific event, and/or an un-addressed non-application-specific event.

An application manager may be utilized for managing native applications within a wireless device, as well as for managing inter-application communications. For example, an application manager within the MMI application framework may utilize application contexts to manage inter-application transitions. A first application that is currently active in the wireless device foreground, for example, may become suspended as a subsequent second application becomes active. Accordingly, after the second application is suspended, the MMI framework may recall the first application so that it becomes active on the wireless device foreground. In this way, the MMI application framework may be utilized in a uniform and structured approach for programming and development of efficient wireless device applications.

Figure 1:
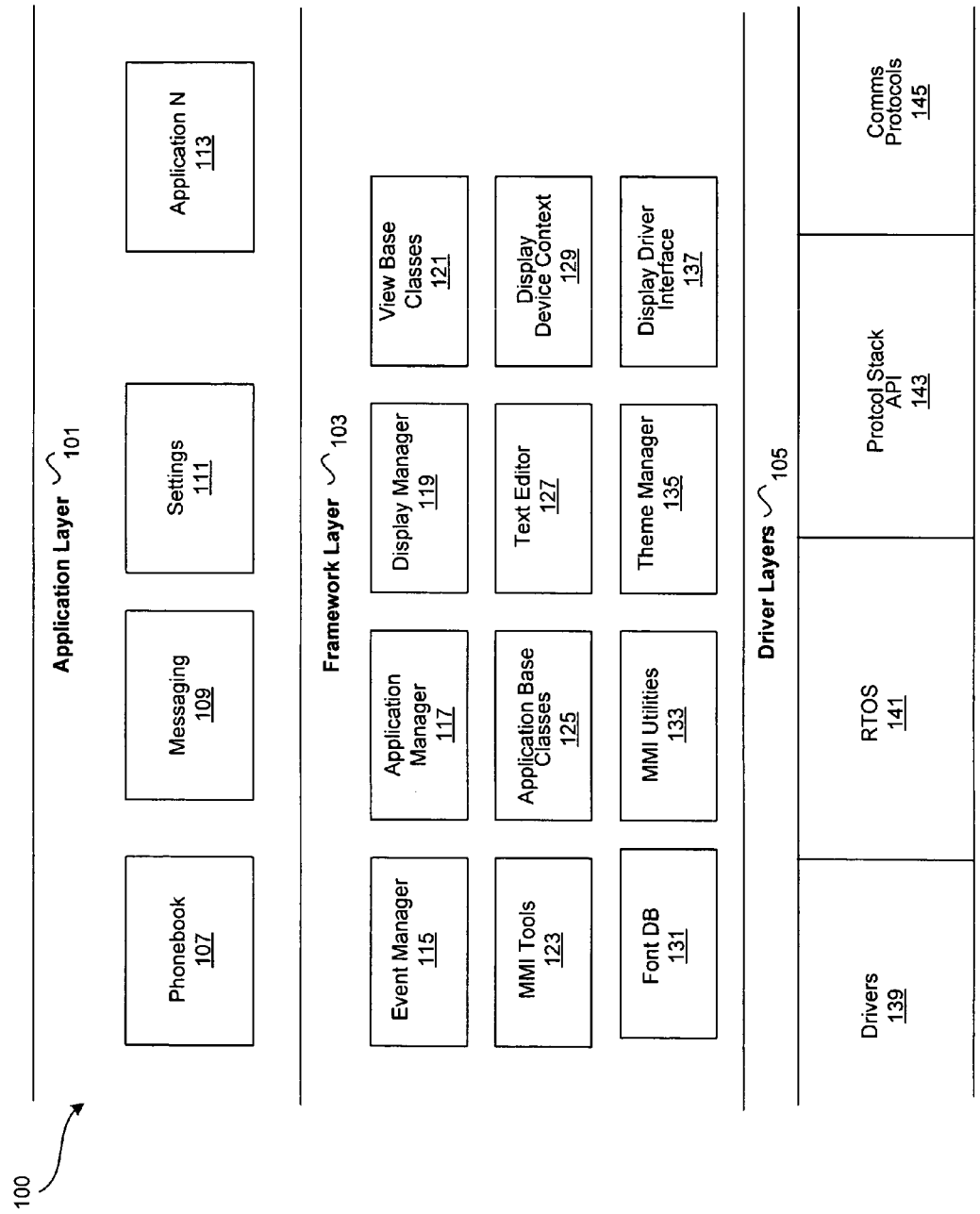
FIG. 1 is a block diagram of an exemplary MMI framework context block utilized in an MMI application framework, in accordance with an embodiment of the invention.

An MMI application framework, in accordance with an aspect of the invention, may be designed to encapsulate wireless device functionality that may change frequently, such as applications, and overall look and feel, and isolate areas that may remain relatively unchanged from handset to handset design. An MMI application framework context may be divided into a plurality of layers, which may be referred to as main layers. FIG. 1 is a block diagram of an exemplary MMI framework context block utilized in an MMI application framework, in accordance with an embodiment of the invention. Referring now to FIG. 1, the MMI framework context block 100 may comprise an application layer 101, a framework layer 103, and driver layers 105. The application layer 101 may comprise a phonebook application 107, messaging application 109, settings application 111 and an additional application, namely, application N 113.

The framework layer 103 may comprise an event manager 115, an application manager 117, a display manager 119, view base classes block 121, MMI tools block 123, application base classes block 125, a text editor 127, display device context block 129, font database 131, MMI utilities block 133, a theme manager 135, and a display driver interface 137.

The driver layers 105 may comprise drivers 139, real time operating system (RTOS) 141, protocol stack API 143, and commands protocols 145.

The application layer 101 may perform the functionality of a design specific MMI, and may include applications and behavior control, as well as user interface general look and feel. The application layer 101 may be modified significantly on a design-by-design basis. In addition, the application layer 101 may include design specific views that may be derived from the MMI framework view classes 121.

The event manager object 115 may be created within the framework layer 103. The MMI event manager 115 may be responsible for managing MMI message queue within a wireless device and may serve as the single point of entry for all messages sent to an MMI task. The event manager 115 may provide a plurality of interfaces for posting messages and may handle dispatching of the messages to the appropriate message handlers within the wireless device.

Message handler objects may be adapted to receive messages from the event manager 115 and may be derived from a message handler class, for example. The message handler class may provide an implementation of a specific design pattern, such as the chain of responsibility design pattern. Message handlers may communicate with other message handlers through message objects from a message class. The message class may comprise of a message ID, opaque data and data size.

The application manager 117 may be a singleton. The application manager 117 may provide, for example, an application registry, application launch services, application control and inter-application transition services, and/or application message dispatch services. Native applications within a wireless device may be required to register with the application manager 117. In addition, the application manager 117 may also be responsible for dispatching application messages to a currently active application.

Applications managed by the application manager 117 may be message handlers and may allow a user to modify data, for example, and change the manner in which it is presented on a wireless device display. The MMI framework may utilize, for example, a Model-View-Controller design pattern. A model-view-controller design is an architecture that may be utilized in graphical user interface (GUI) programming. It allows data to be displayed in one or more views while being manipulated by multiple sources. An application base class may be created to leverage existing application development and state machine architecture. Third party applications may be added using an adapter class that may be derived from the application base class.

The display manager 119 may be responsible for providing management of all visible views and it may utilize view management techniques designed to provide efficient screen updates. Separate display manager instances may be created for each display device in a system. A display manager may determine which views may need to be redrawn and appropriate draw commands may be issued for drawing these views. A view may be covered by other views. In this case, there may be no updates performed by the display manager.

View base classes block 121 may be associated with different application views within the MMI framework. Views may be responsible for the graphical presentation of data, and may format and draw data maintained by a backing model, for example. A set of foundation view classes may be included in the MMI framework. The existing view classes within the foundation class may be sub-classed to meet additional requirements on a design-by-design basis.

The display device context block 129 may be utilized as a view's interface to a display device. A view may utilize its device context to access drawing primitives in order to draw itself, for example. Drawing primitives may include lines, rectangles, and polygons. A display device context block 129 may provide access to the following features: device context attributes, color palette, drawing functions, text and font metrics and drawing routines, and/or access to a frame buffer. A plug-in architecture may be employed to abstract the drawing primitive interface from a device specific display driver. Accordingly, the plug-in may be utilized to provide cross-platform functionality.

A bridge architecture may be employed to provide a single interface point, a text editor class for example, between applications and the text editing system 127 within the MMI framework. The text editing system 127 may provide numeric, multi-tap and predictive input methods. An application may create a text editor instance, which may be responsible for establishing and managing the text-editing environment specified by the application.

The MMI tools block 123 may comprise a set of build tools that may be available within the MMI framework to generate application specific mode trees, a localized string database, predefined menus and PLMN information, for example. Build tools may include, for example, Perl script and executable programs.

Figure 2:
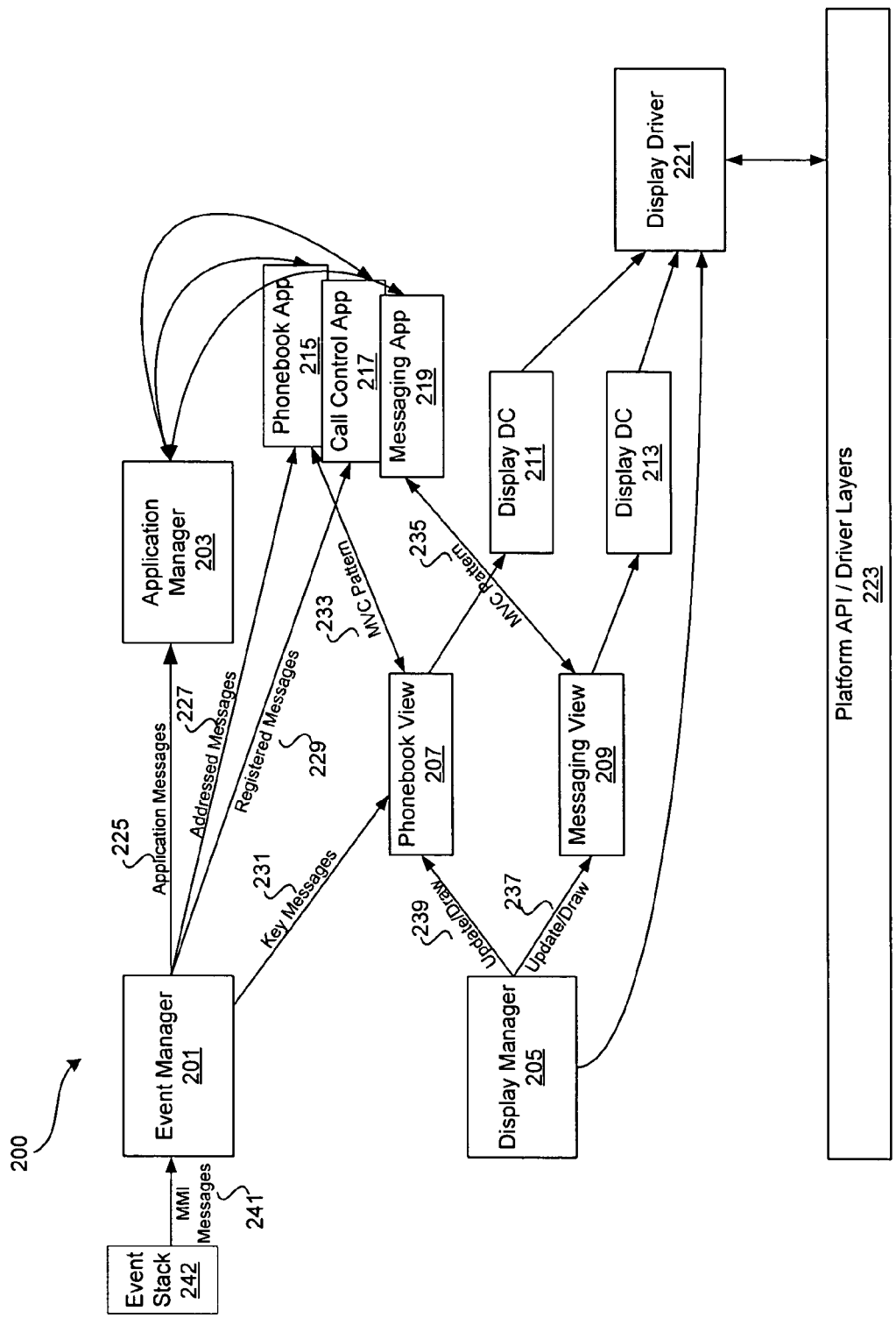
FIG. 2 is an interaction block diagram of MMI application framework, in accordance with an embodiment of the invention.

FIG. 2 is an interaction block diagram of MMI application framework, in accordance with an embodiment of the invention. Referring to FIG. 2, the MMI application framework 200 may comprise an event manager 201, an application manager 203, a display manager 205, an event queue 242, a phonebook application 215, a call control application 217, a messaging application 219, a display driver 221 and platform API/driver layers 223. The display manager 205 may create different views, such as a phonebook view 207 and a messaging view 209, for example. Each view may be associated with a display device context block 211 and 213. In addition, each view 207 and 209 may be updated by update/draw commands 239 and 237, respectively.

The MMI event manager 201 may act as the single point of entry for all MMI messages 241 received from the event queue 242. The event manager 201 may queue events from the event queue 242 and may dispatch them to MMI handlers within the MMI framework 200. System events may be translated into an MMI message format using an adapter design pattern, for example. The event manager 201 may utilize several different approaches to manage events, depending on the event type. In one aspect of the invention, the event manager 201 may be adapted to handle the following types of events/messages within the MMI framework 200: timing event, keypad event, addressed events, platform events, unaddressed application specific and remaining un-addressed events.

Timing events may be dispatched directly from the event manager 201 to their owner. Timing events may comprise timing expiration messages, for example. A client, such as an application, may create a timer when the client is in an active state. During a time when the application is running, the timer may be owned by the client. After the timer expires, the event manager may dispatch a timing expiration message to the client owner. Addressed messages may comprise timing events. For example, a timing event may be communicated from the event manager 201 to the phonebook application 215 via an addressed message 227.

Any time a key is pressed, a keypad event may be dispatched to the currently active view, which may be determined by the display manager 205. For example, the event manager 201 may dispatch a key message 231 to the phonebook view 207 created by the display manager 205. The keypad event dispatcher may iterate through the chain of handlers until either a keypad event is consumed or the end of the chain is reached. A keypad event may indicate which key is pressed, whether a key is pressed or released, or whether it has been pressed for an extended period of time.

Addressed events may be identified by the presence of a destination handler and may be dispatched directly to the destination handler. An example of addressed events may be the addressed messages 227 and the registered messages 229 dispatched from the event manager 201 to the phonebook application 215 and the call control application 217, respectively. The model-view-control design patterns 233 and 235 may be utilized to control transfer of information between the views 207 and 209 and the applications 215 and 219, respectively.

Platform events may be events received directly from a protocol stack within the MMI framework 200, and may comprise interrupts from the platform API and the driver layer 223, for example. Platform events, similarly to the addressed events, may be dispatched directly to their registered handler(s). Handlers within the MMI framework 200 may register for different categories of platform events, for example, events related to making and/or receiving a phone call, making/sending SMS message, general phone control events, etc.

Un-addressed application specific events, such as the application messages 225 that are identified by their message type, may be dispatched to the application manager 203, which will determine which application should receive those messages. Un-addressed application specific events may comprise an MMI posted event without a specific destination handler associated with it. After the event manager 201 dispatches such events to the application manager 203, the application manager 203 may then delegate responsibility for the un-addressed event and may further dispatch it for handling. During processing of un-addressed application specific events, the event manager 201 may initially confirm that the un-addressed message qualifies as an application message. If the un-addressed message qualifies as an application message, the event manager 201 may then dispatch the un-addressed message to the application manager 203. The application manager 203 may then locate an active application and may communicate the un-addressed message to the active application.

Remaining un-addressed events may be dispatched by the event manager 201 to the current target handler. The event manager 201 may iterate through the target handler's message chain until either the un-addressed event is consumed or the end of the chain is reached. Events/messages may be posted to the event manager 201 by applications and other contexts using a message posting interface. The event manager 201 may also be adapted to deleting all messages when they are no longer needed within the MMI framework 200.

In another aspect of the invention, the event manager 201 may be adapted to provide an event registration service. Applications may register with the event manager 201 to receive certain types of platform events. Platform events may be grouped by category, such as call control, short message service (SMS), etc. Typically, the protocol stack may generate platform events. When the event manager 201 receives a platform event, it may dispatch it to registered handlers. The event manager 201 may work with the application manager 203 to ensure that applications receive application specific events. An application specific event may be dispatched to the currently active application context and not to a registered handler.

Classes receive messages, such as message handler classes, from the event manager 201 may be derived from a message handler class. For example, views and applications within the MMI framework 200 may be derived from such message handler class. A message handler may be adapted to handle and consume the message (return true), handle the message and generate a new, more specific message (return true), handle the message and allow it to continue to be passed up the message chain (return false), and/or pass the message up the message chain (return false). Within the MMI framework 200, messages may be passed as lightweight objects.

The application manager 203 may be a singleton that maintains control of all applications in the MMI framework 200 and facilitates inter-application communications. The application manager 203 may provide the following services: maintaining an application registry, application launch services, application control and inter-application transition services, and application message dispatch services. The application manager 203 may load all native applications at startup by using an application registry. The application registry may be design specific and may incorporate all native framework applications. In addition, the application manager 203 may provide a name lookup service, which may allow applications to be accessed and launched by its name. Applications may also utilize the service to request services from another application.

Application contexts may allow the application manager 203 to manage inter-application transitions. For example, the application manager 203 may manage transitions using an active application context and a stack of suspended application contexts. The context stack may comprise a last-in-first-out (LIFO) stack. A single application may have more than one context on the application manager 203's LIFO stack at a time. Multiple contexts for a single application may indicate that that application has been reentered /suspended one or more times.

An application within the MMI framework 200 may become the active foreground application in one or more ways. For example, a new application that is launched by the system or by another application may be active in the foreground. When an application is launched, the application manager 203 may automatically make the launched application the active application and assign it a unique context identifier. The second way for an application to become the foreground application is by handling a service request from another application, or by handling an external system event. In both cases, the handling application must indicate to the application manager 203 that it will become the active application. The application manager 203 may then assign the application a context identifier. When the active application exits, the application manager 203 may delete the last suspended context off of its LIFO stack, making the previous, last saved, context the active context. In addition, the previous context's resume callback procedure may be called. The resume callback may allow the application to restore any state information that was saved when the context was suspended.

Applications within the MMI framework 200 may be launched using a launch interface of the application manager 203. Applications may be launched by name. Launching an application may cause the application manager 203 to create an application context for the application that is being launched. An application base class may be responsible for providing the launch interface. The application manager 203 may utilize this method to inform the application that it is being launched, and to relay launch control data, a launch code and/or a context identifier to the application. Each application may store the context identifier it receives from the Application manager 203 for future reference, for example prior to exiting a context.

Application launch codes or identifiers may be used by applications to request specific services from other applications. A default launch code or launch identifier may be utilized within the MMI framework 200 and it may instruct applications to launch into their startup screen or main menu. Other, application specific, launch codes may also be provided. Such application specific launch codes may be defined by the application that is providing the service. Applications may define launch codes for services that are either asynchronous in nature or require the application to draw on a display. Application services that are synchronous in nature may be provided via a direct interface for efficiency reasons.

As part of a launch process, a launching application may be sent a suspend message. The launching application may then utilize launch control flags to control the launching action. For example, a launch control flag may inform the application manager 203 that the launching application wishes to exit its current context, so that the application manager 203 may not push that context on to its suspended context stack. On power up, an idle, or system application may be launched by the system. The system application may be utilized to manage the main menu and to launch other applications.

Launching an application within the MMI framework 200 may result in the creation of an application context by the application manager 203. An application context may also be created by an application using the application manager 203. An application utilizing the application manager 203 may become the active application and may cause the currently active application to be suspended by the application manager 203. The activated application may be assigned a unique application context identifier that may be saved for future reference.

When an application context is created, this may cause the application to become an active, or foreground, application. As the active application, it may also get first chance at un-addressed application message types. The current application may be notified by the application manager 203, via a suspend event, if another application is brought to the foreground. In addition, a suspended event may provide the current application with an opportunity to save its state information and provide a resume callback to the application manager 203. In this way, the current application may resume where it left off when it was suspended using its saved state information.

Within the MMI framework 200, applications may be adapted to create an application context whenever they are handling a service request. However, applications that provide services using launch codes may utilize an application context that may be created by the application manager 203. Applications that do not use launch codes to provide services may be adapted to create contexts themselves for the following cases: when showing a view, when the request cannot be handled synchronously, and when handling complex requests that may be interrupted by other applications. Synchronous services, for example, may be an exception to this "context rule." Synchronous services may not require an application context and they may be provided by applications as direct interfaces, for simplicity and performance reasons.

Regardless of whether an application was launched by another object or it created its own context, applications may be responsible for knowing when they are exiting a context. When exiting, an application may inform the application manager 203, utilizing a previously assigned context identifier as a parameter. For example, if the application manager 203 receives an exit message from an application, it may check whether the context contained in the message is the active context. If the context in the message is not the currently active context, the application manager 203 may remove the context from its stack and may release any saved state information. If the context in the message is the active context, the application manager 203 may read the next application context from its LIFO stack, making it the active application. In addition, the application manager 203 may call that application's resume callback procedure with the context's saved state information as a parameter, and may release the saved state information. The application manager 203 may also provide support for an interface that allows an immediate return to the idle screen, default screen or desktop. When an application invokes this command, the application manager 203 may send a terminate message to all applications, active or suspended, clear its context stack, and release all saved state information. In this regard, a resume callback procedure may not be invoked.

Applications within the MMI framework 200 may act as message handlers, controllers and/or models. In their role as message handlers, applications may respond to system and user events. As message handlers, applications may generate more specific messages with regard to registered events. Applications may also register with the event manager 201 as handlers for mobile system message types, for example. These are messages that may be generated by the underlying protocol stack.

As controllers, applications within the MMI framework 200 may be adapted to manipulate data and change the manner in which the data is displayed. Applications may create views, as required, to display data in the desired format. Applications may also launch other applications and may be responsible for notifying the application manager 203 upon exiting the application context. As models, applications may maintain data and may notify registered observers, such as views, when that data changes.

Figure 3:
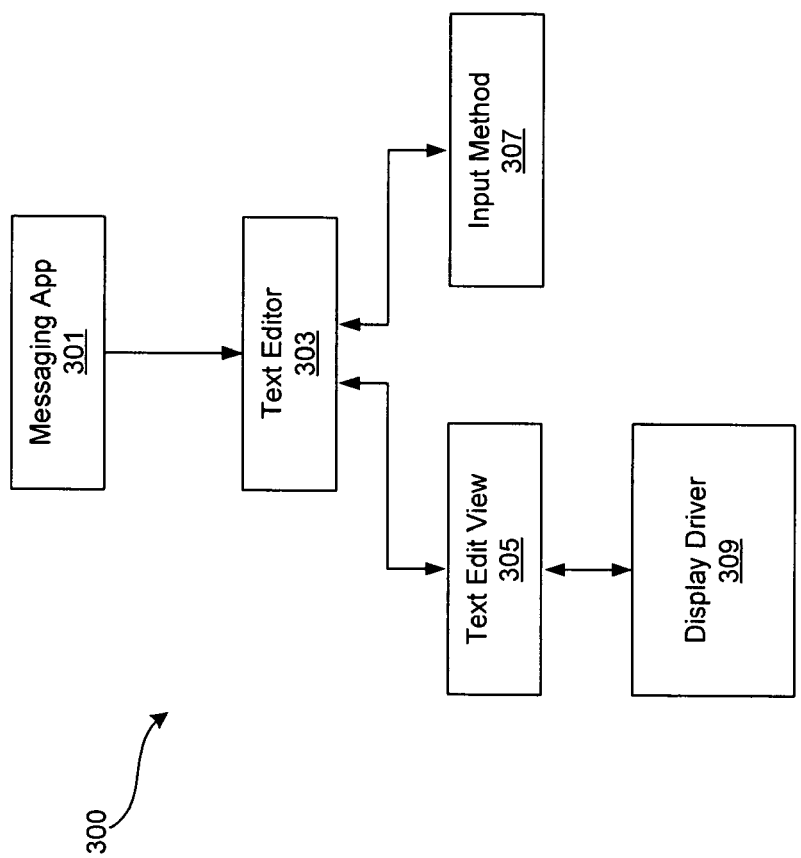
FIG. 3 is an interaction block diagram of a text editor that may be utilized within the MMI application framework of FIG. 2, in accordance with an embodiment of the invention.

FIG. 3 is an interaction block diagram 300 of a text editor that may be utilized within the MMI application framework of FIG. 2, in accordance with an embodiment of the invention. Referring now to FIG. 3, there is illustrated a text editor 303, a text edit view 305, an input method block 307, and a display driver 309. The text editor 303 may be communicatively coupled to an application, such as the messaging application 301.

In one aspect of the invention, a text editor 303 may be utilized, in combination with a text edit view 305 and an input method block 307 in order to handle text editing tasks within a MMI framework. Clients, for example applications, may utilize the text editor 303 whenever entering text is required. In order to accomplish such functionality, the text editor 303 may utilize a text edit view 305 and an input method block 307.

The text edit view 305 may be responsible for drawing text on the screen. In order to create text input, applications may require both a text edit view and a way to process key presses, or the input method. An application may need to create several text editors over its lifetime. Each of these editors may have different constraints, like maximum string length or desired input method choices, for example numeric-only input, countdown timer, IP address, etc. As these constraints change, the text edit view 305 may also change. The text editor 303 may allow applications to switch between input methods and change text input parameters. The application may not need to handle the creation and deletion of the individual elements, such as input method and text edit view, but may simply maintain text editor related objects.

Input methods 307 may process key presses and may interpret the key presses as characters. The basic input methods 307 that may be utilized within the MMI framework are predictive input, a multi-tap input, and a numeric input. For rich text input, a separate class may be derived. When composing an SMS message, the text buffer encoding may change as the user enters data, for example, from non-Unicode to Unicode 80 for media types, Chinese characters. A rich text format class may also hold the media data separately from the text buffer, and may convert between embedded media, such as UDH format, and independent media, such as text and media objects.

The text edit view 305 may comprise an abstract class for drawing text input views within the MMI application framework. Classes may be derived from the text edit view abstract class. Derived classes may be utilized for editing multiple lines of text and for editing specialized views, such as date, time, and IP address input. The text edit view 305 may be customizable. Among the customization features of the text edit view 305 may be a password flag that masks a password by showing, for example, "***" instead of the characters entered, and an "always show prompt" flag, which may not allow the prompt string to scroll out of view.

Some text input applications may require special character input. In this case, applications may use a symbol picker as a supplement to another input method, for example predictive input, multi-tap input, and numeric input. The user may navigate through a menu to open the symbol picker. The text editor 303 may provide a method, which displays the list of special characters. After the symbol picker is dismissed, the text editor 303 may restore the original input method and, if a character was selected, may insert the selected character into the text buffer.

In operation, a key stroke may be initiated on a wireless device utilizing the MMI application framework 200. The wireless device may be in an "idle screen" state and a right arrow key, for example, may be pressed. After the key is pressed, a key event may be logged in queue in the event queue 242. The logged event may then be communicated as an MMI message 241 from the event queue 242 to the event manager 201. The event manager 201 may then communicate the key message 231 to the currently active view or target view.

For example, the key message 231 may be communicated to the phonebook view 207, which may be currently active. The phonebook view 207 may be part of its parent application, the phonebook application 215. After the phonebook view 207 receives the key message 231, it may either handle and consume the message itself, or it may ignore the message. If the phonebook view 207 ignores the key message 207 and does not handle it, the event manager 201 may then communicate the key message 231 to the parent application, the phonebook application 215, for further handling. After the key message 231 is consumed, a new, different view may be displayed on the wireless device screen.

Figure 4:
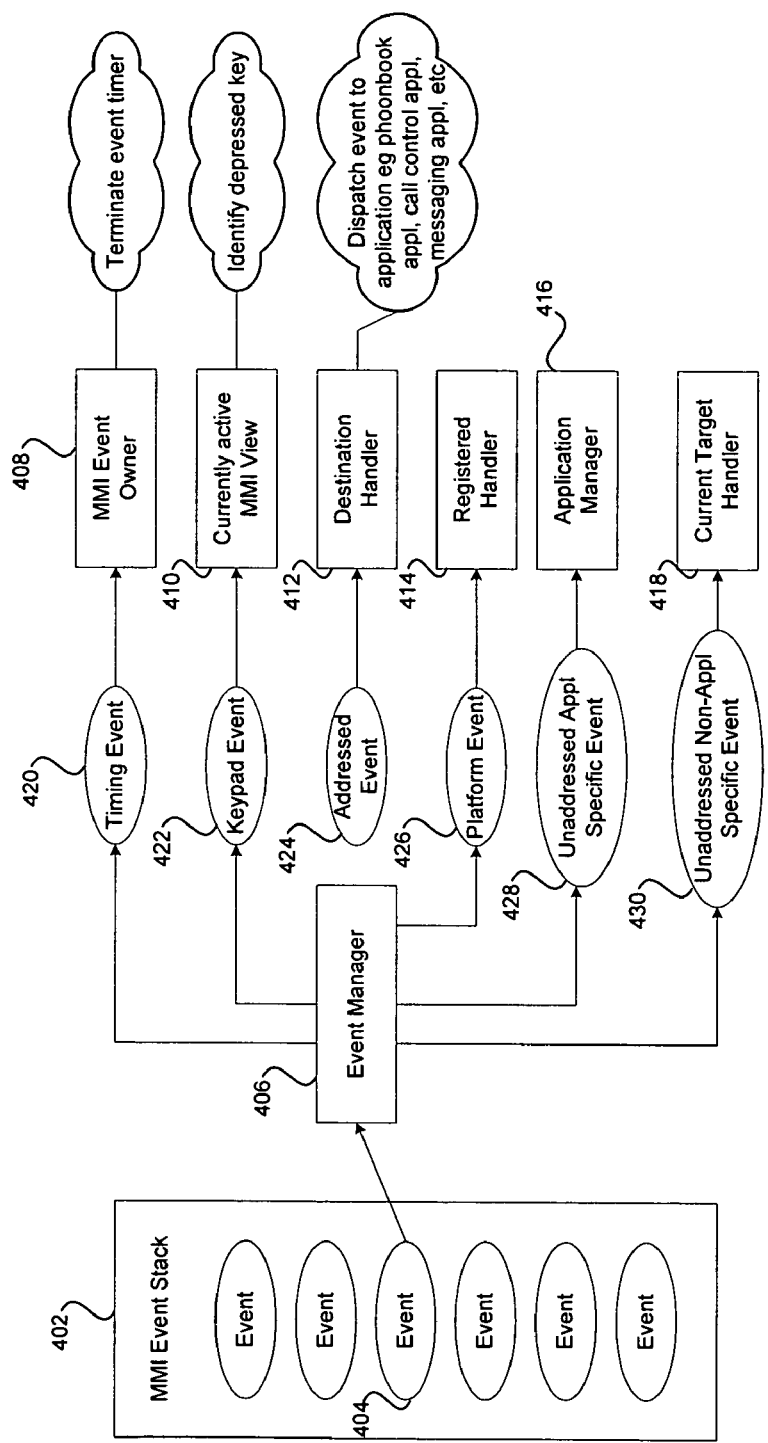
FIG. 4 is a block diagram of an exemplary system that may be utilized for managing a plurality of events within a man machine interface (MMI) application framework, in accordance with an embodiment of the invention.

FIG. 4 is a block diagram of an exemplary system that may be utilized for managing a plurality of events within a man machine interface (MMI) application framework, in accordance with an embodiment of the invention. Referring to FIG. 4, there is shown an MMI stack 402, an event manager 406, an MMI event owner 408, a currently active MMI view 410, a destination handler 412, a registered handler 414, an application manager 416, and a current target handler 418. FIG. 4 is also a timing event 420, a keypad event 422, an addressed event 424, a platform event 426, an unaddressed application specific event 428, and an unaddressed non-application specific event 430.

An event manager 406 may acquire an MMI event 404 from the MMI stack 402 and the acquired MMI event 404 may be dispatched based on a determined identity of the acquired MMI event. If the acquired MMI event 404 comprises a timing event 420, the acquired MMI event 404 may be dispatched to the MMI event owner 408 within the MMI wireless framework. In instances where the acquired MMI event 404 comprises a keypad event 422, the acquired MMI event may be dispatched to the currently active MMI view 410 within the MMI wireless framework. If the acquired MMI event 404 comprises an addressed event 424, the acquired MMI event may be dispatched to the destination handler 412 within the MMI wireless framework. In instances where the acquired MMI event 404 comprises a platform event 426, the acquired MMI event may be dispatched to the registered handler 414 within the MMI wireless framework. If the acquired MMI event 404 comprises an unaddressed application specific event 428, the acquired MMI event may be dispatched to an application manager 416 within the MMI wireless framework. If the acquired MMI event comprises an unaddressed non-application specific event 430, the acquired MMI event may be dispatched to a current target handler 418 within the wireless framework.

In accordance with another aspect of the invention, the MMI event owner 408 may terminate the event timer upon receipt of the timing event 420. The currently active MMI view 410 may be adapted to identify a depressed key in instances where the keypad event 422 is received. In instances where an addressed event 424 is received, the addressed event 424 may be dispatched to at least one application, the latter of which may include, for example, a phonebook application, a call control application, and/or a messaging application. The platform event 426 comprises a platform API interrupt message and the application manager 416 may be adapted to delegate the unaddressed application specific event 428 to a handling application. Unaddressed non-application specific events 430 may be matched with a message within a message chain of the current target handler. If an acquired MMI event 404 is a platform event, the registered handler 414 may be registered to acquire the MMI event. The acquired MMI event 404 may be derived from a message handling class within the MMI application framework.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for managing a plurality of events within a man machine interface (MMI) application framework, the method comprising:
    acquiring an MMI event from an MMI event queue within the MMI application framework;
    determining an identity of said acquired MMI event; and
    if said acquired MMI event comprises a timing event, dispatching said acquired MMI event to an MMI event owner within the MMI application framework;
    if said acquired MMI event comprises a keypad event, dispatching said acquired MMI event to a currently active MMI view within the MMI application framework;
    if said acquired MMI event comprises an addressed event, dispatching said acquired MMI event to a destination handler within the MMI application framework;
    if said acquired MMI event comprises a platform event, dispatching said acquired MMI event to at least one registered handler within the MMI application framework;
    if said acquired MMI event comprises an unaddressed application specific event, dispatching said acquired MMI event to an application manager within the MMI application framework; and
    if said acquired MMI event comprises an unaddressed non-application specific event, dispatching said acquired MMI event to a current target handler within the application framework.

2. The method according to claim 1, comprising terminating an event timer upon receipt of said timing event by said MMI event owner.

3. The method according to claim 1, comprising identifying a depressed key by said currently active MMI view upon receipt of said keypad event.

4. The method according to claim 1, comprising dispatching said addressed event to at least one application, said at least one application comprising a phonebook application, a call control application, or a messaging application.

5. The method according to claim 1, wherein said platform event comprises a platform API interrupt message.

6. The method according to claim 1, comprising delegating said unaddressed application specific event to a handling application by said application manager.

7. The method according to claim 1, comprising matching said unaddressed non-application specific event with a message within a message chain of said current target handler.

8. The method according to claim 1, comprising, if said acquired MMI event comprises a platform event, registering at least one handler for acquiring said MMI event.

9. The method according to claim 1, comprising deriving at least one of the plurality of events from a message handling class within the MMI application framework.

10. The method according to claim 1, comprising deleting said acquired MMI event from said MMI event queue after dispatching said acquired MMI event.

11. A machine-readable storage having stored thereon, a computer program having at least one code section for managing a plurality of events within a man machine interface (MMI) application framework, the at least one code section being executable by a machine for causing the machine to perform steps comprising:
    acquiring an MMI event from an MMI event queue within the MMI application framework;
    determining an identity of said acquired MMI event; and
    if said acquired MMI event comprises a timing event, dispatching said acquired MMI event to an MMI event owner within the MMI application framework;
    if said acquired MMI event comprises a keypad event, dispatching said acquired MMI event to a currently active MMI view within the MMI application framework;
    if said acquired MMI event comprises an addressed event, dispatching said acquired MMI event to a destination handler within the MMI application framework;
    if said acquired MMI event comprises a platform event, dispatching said acquired MMI event to at least one registered handler within the MMI application framework;
    if said acquired MMI event comprises an unaddressed application specific event, dispatching said acquired MMI event to an application manager within the MMI application framework; and
    if said acquired MMI event comprises an unaddressed non-application specific event, dispatching said acquired MMI event to a current target handler within the application framework.

12. The machine-readable storage according to claim 11, comprising code for terminating an event timer upon receipt of said timing event by said MMI event owner.

13. The machine-readable storage according to claim 11, comprising code for identifying a depressed key by said currently active MMI view upon receipt of said keypad event.

14. The machine-readable storage according to claim 11, comprising code for dispatching said addressed event to at least one application, said at least one application comprising a phonebook application, a call control application, or a messaging application.

15. The machine-readable storage according to claim 11, wherein said platform event comprises a platform API interrupt message.

16. The machine-readable storage according to claim 11, comprising code for delegating said unaddressed application specific event to a handling application by said application manager.

17. The machine-readable storage according to claim 11, comprising code for matching said unaddressed non-application specific event with a message within a message chain of said current target handler.

18. The machine-readable storage according to claim 11, comprising code for, if said acquired MMI event comprises a platform event, registering at least one handler for acquiring said MMI event.

19. The machine-readable storage according to claim 11, comprising code for deriving at least one of the plurality of events from a message handling class within the MMI application framework.

20. The machine-readable storage according to claim 11, comprising code for deleting said acquired MMI event from said MMI event queue after dispatching said acquired MMI event.

21. A system for managing a plurality of events within a man machine interface (MMI) application framework, the system comprising:
- an MMI event queue from which an MMI event is acquired within the MMI application framework; and
- an MMI event owner within the MMI application framework to which said MMI event is dispatched if said acquired MMI event comprises a timing event;
- a currently active MMI view within the MMI application framework to which said MMI event is dispatched if said MMI event comprises a keypad event;
- a destination handler within the MMI application framework to which said MMI event is dispatched if said MMI event comprises an addressed event;
- at least one registered handler within the MMI application framework to which said MMI event is dispatched if said MMI event comprises a platform event;
- an application manager within the MMI application framework to which said MMI event is dispatched if said MMI event comprises an unaddressed application specific event; and
- a current target handler within the MMI application framework to which said MMI event is dispatched if said MMI event comprises an unaddressed non-application specific application specific event.

22. The system according to claim 21, comprising an event timer that is terminated upon receipt of said timing event by said MMI event owner.

23. The system according to claim 21, wherein said currently active MMI view identifies a depressed key upon receipt of said keypad event.

24. The system according to claim 21, wherein said addressed event is dispatched to at least one application, said at least one application comprising a phonebook application, a call control application, or a messaging application.

25. The system according to claim 21, wherein said platform event comprises a platform API interrupt message.

26. The system according to claim 21, wherein said unaddressed application specific event is delegated to a handling application by said application manager.

27. The system according to claim 21, wherein said unaddressed non-application specific event is matched with a message within a message chain of said current target handler.

28. The system according to claim 21, wherein at least one handler is registered for acquiring said MMI event, if said acquired MMI event comprises a platform event.

29. The system according to claim 21, wherein said acquired MMI event is derived from a message handling class within the MMI application framework.

30. The system according to claim 21, wherein said acquired MMI event is deleted from said MMI event queue after dispatching said acquired MMI event.

* * * * *